US012679489B2

(12) United States Patent
Keller

(10) Patent No.: US 12,679,489 B2
(45) Date of Patent: Jul. 14, 2026

(54) LIGHT ASSEMBLY FOR MOUNTING ON A BICYCLE AND FOR PROVIDING A LIGHTING FUNCTION, AND LIGHTING SYSTEM WITH TWO SUCH LIGHT ASSEMBLIES

(71) Applicant: motogadget GmbH, Berlin (DE)

(72) Inventor: Garrit Keller, Berlin (DE)

(73) Assignee: motogadget GmbH, Berlin (DE)

( * ) Notice: Subject to any disclaimer, the term of this patent is extended or adjusted under 35 U.S.C. 154(b) by 0 days.

(21) Appl. No.: 19/257,842

(22) Filed: Jul. 2, 2025

(65) Prior Publication Data

US 2026/0048800 A1 Feb. 19, 2026

(30) Foreign Application Priority Data

Jul. 2, 2024 (EP) ..................................... 24185920

(51) Int. Cl.
| | |
|---|---|
| *B62J 6/056* | (2020.01) |
| *B62J 6/015* | (2020.01) |
| *B62J 6/045* | (2020.01) |
| *B62K 21/26* | (2006.01) |
| *F21S 43/14* | (2018.01) |
| *F21S 43/20* | (2018.01) |
| *F21V 23/00* | (2015.01) |
| *F21V 23/04* | (2006.01) |
| *F21V 29/70* | (2015.01) |

(Continued)

(52) U.S. Cl.
CPC .............. *B62J 6/056* (2020.02); *B62J 6/015* (2020.02); *B62J 6/045* (2020.02); *B62K 21/26* (2013.01); *F21S 43/14* (2018.01); *F21S 43/26211* (2024.05); *F21V 23/005* (2013.01); *F21V 23/04* (2013.01); *F21V 29/70* (2015.01);

*H05B 47/155* (2020.01); *F21W 2103/20* (2018.01); *F21W 2103/35* (2018.01); *F21Y 2113/17* (2016.08); *F21Y 2115/10* (2016.08)

(58) Field of Classification Search
CPC ..... B62K 19/40; B62K 21/26; F21V 33/0004; F21V 29/70; B62J 6/055; F21Y 2115/10; F21Y 115/10
See application file for complete search history.

(56) References Cited

U.S. PATENT DOCUMENTS

2010/0053984 A1* 3/2010 Wang ....................... B62J 6/015
362/474

FOREIGN PATENT DOCUMENTS

EP 2439132 A2 4/2012

OTHER PUBLICATIONS

English Abstract of EP2439132A2.

* cited by examiner

*Primary Examiner* — William J Carter
(74) *Attorney, Agent, or Firm* — William J. Barber; WARE FRESSOLA MAGUIRE & BARBER LLP

(57) ABSTRACT

The invention relates to a light assembly configured for mounting on a bicycle, in particular on an e-bike, and for performing a lighting function or part thereof. It is suggested that the light assembly comprises as an integral unit a handlebar grip intended for mounting on a distal handle end of a handlebar tube of the bicycle, a light fixture with at least one light source, in particular a semiconductor light source, control electronics for controlling the light source and for implementing the lighting function, and an operating element, in particular a button, for controlling the at least one light source and is configured for mounting on the distal handle end as a unit.

17 Claims, 7 Drawing Sheets

(51) Int. Cl.
    F21Y 115/10         (2016.01)
    H05B 47/155      (2020.01)
    *F21W 103/20*       (2018.01)
    *F21W 103/35*       (2018.01)
    *F21Y 113/17*        (2016.01)

LIGHT ASSEMBLY FOR MOUNTING ON A BICYCLE AND FOR PROVIDING A LIGHTING FUNCTION, AND LIGHTING SYSTEM WITH TWO SUCH LIGHT ASSEMBLIES

BACKGROUND OF THE INVENTION

Field of the Invention

The present invention relates to a light assembly configured for mounting on a bicycle, in particular on an e-bike, and for providing a lighting function or part thereof.

The invention also relates to a lighting system configured for mounting on a bicycle, in particular on an e-bike, and for providing a lighting function, wherein the lighting system comprises two of the light assemblies.

Prior Art

In recent decades, the bicycle has experienced a significant renaissance as a preferred means of transport, especially in urban areas. With growing environmental awareness and the pursuit of sustainable mobility solutions, the bicycle has become a symbol of environmentally friendly transportation. The introduction of the electrically powered or assisted bicycle (e-bike) has further reinforced this trend by making longer distances and hilly areas accessible to bicycles, thus appealing to a broader segment of the population.

Precisely because of these positive developments, the safety of cyclists is increasingly becoming a central concern. Especially in densely populated urban areas, clear and visible communication of changes in direction is of great importance in order to avoid accidents and ensure a smooth flow of traffic. This is where the present invention comes in.

In Germany, direction indicator lights for bicycles were prohibited for a long time due to legal regulations. The Road Traffic Regulations (StVO) did not provide for any explicit regulations for such direction indicator lights on bicycles, which is why the use of direction indicator lights for bicycles was not permitted. As a result, cyclists traditionally had to indicate their changes of direction with hand signals, which was particularly problematic in the dark or in poor visibility conditions. This was also problematic from a safety perspective, as the cyclist had to take one hand off the handlebars and could only steer the bicycle with the other hand.

However, with the increasing use of bicycles and e-bikes, especially in urban areas, and growing awareness of the need for improved road safety, the legal situation in Germany has changed. The StVO has been amended to allow bicycles and e-bikes to be equipped with indicator lights. This change is a significant step towards better integration of bicycles into road traffic and increased safety for all road users, both actively, as cyclists can keep both hands on the handlebars even when indicating a change of direction, and passively, as other road users now receive a clear and unambiguous indication of a change of direction by a bicycle.

The advantage of legalising bicycle indicator lights is increased safety. Bicycle indicator lights significantly improve the visibility of direction indications during the day and at night. This enables motorists and other road users to recognise the intentions of cyclists more quickly and clearly, which reduces the risk of accidents, especially at intersections and junctions.

Bicycle indicator lights also offer advantages in terms of comfort and stability for cyclists. By using indicator lights, cyclists no longer have to take one hand off the handlebars to give a hand signal. This improves stability and control over the bicycle, especially in difficult road conditions, such as on winding and/or uneven roads or at high speeds, particularly in view of the fast e-bikes that are being ridden by an increasingly older group of users.

The introduction of standardised indicator lights for bicycles creates a uniform signal image that is understood by all road users. This contributes to more harmonious and safer interaction between cyclists and other road users in road traffic.

The new legal regulations also specify the technical requirements for bicycle indicator lights. These must, for example, ensure a certain level of brightness and visibility so that they can be seen even in bright daylight and from different angles. They must also be robust and weatherproof in order to withstand the diverse environmental conditions to which bicycles are exposed in daily use.

The legalisation of bicycle indicator lights in Germany represents an important step forward in the development of safe urban mobility. It reflects the growing importance of bicycles as a sustainable means of transport and the need to improve road safety for all road users.

The direct transfer of existing two-wheeled indicator light concepts, such as those used on motorised scooters or motorcycles, to bicycles would involve considerable additional effort and high costs for production and installation on bicycles.

Furthermore, the design of bicycle components has different priorities than that of motorised scooters or motorcycles. These priorities lie in particular in lightweight construction and minimal complexity. For example, bicycle derailleurs and height-adjustable seat posts are now controlled wirelessly by radio to reduce weight and complexity.

When adapting existing conventional indicator lighting systems for motorcycles for use on a bicycle, additionally the following components would have to be installed on the bicycle or the following measures would have to be taken:

attach indicator light with mounting part to the front left of the bicycle, attach indicator light with mounting part to the front right, attach indicator light with mounting part to the rear left, attach indicator light with mounting part to the rear right, attach control electronics (flasher unit) to bicycle, attach operating element to handlebars to operate indicator lights on bicycle, route and secure cable from control electronics to power source, route and secure cable from operating element to control electronics, route and secure cable from the front left indicator light to the control electronics, route and secure cable from the front right indicator light to the control electronics, route and secure cable from the rear left indicator light to the control electronics, route and secure cable from the rear right indicator light to the control electronics, and provide and install fastening and contacting material required for installation, as well as cable ties and retaining brackets.

The installation of these additional components—in addition to the additional weight of these components—involves a considerable amount of time and thus an increase in costs in the industrial production of bicycles or e-bikes.

Furthermore, it is not possible for a layman without technical knowledge to retrofit such a conventional indicator lighting system to his bicycle or e-bike. All bicycle indicator lights currently available on the market are based on the conventional approach described above.

SUMMARY OF THE INVENTION

An object of the present invention is proposing an innovative lighting system, in particular a turn signal lighting system, specifically for bicycles, which increases both safety and user-friendliness, especially with regard to easier installation on bicycles or e-bikes, by maximising the visibility of the direction indication and thus making a significant contribution to improving road safety.

To solve this problem, a light assembly with the features of claim 1 and a lighting system with the features of claim 14 are suggested. In particular, based on the light assembly of the type mentioned at the beginning, it is suggested that the light assembly comprises a light fixture with at least one light source, in particular a semiconductor light source, and a control electronics designed to control the light source and implement the lighting function. The control electronics are preferably an integral part of the light fixture. Preferably, the control electronics are arranged and connected in the form of a microcontroller or microprocessor on a circuit board of the light fixture, which also carries and connects the at least one light source. Furthermore, the light assembly advantageously comprises a handlebar grip intended for mounting on a distal handle end of a handlebar tube of the bicycle. The light fixture, the control electronics and an operating element, in particular a button, which is configured to control the at least one light source, are designed as an integral unit together with the handlebar grip. The handlebar grip with the light fixture, control electronics and operating element attached thereto or integrally formed therewith is designed for mounting on the distal handle end as an integral unit, which can be separately handled.

Based on the lighting system of the type mentioned at the beginning, it is suggested that the lighting system comprises two light assemblies according to the invention, where one of the light assemblies is configured for mounting as an integral unit on a first distal handle end of a handlebar tube of the bicycle and the other light assembly is configured for mounting as an integral unit on a second distal handle end of the handlebar tube opposite to the first distal handle end.

The solution according to the invention combines the following three main assemblies in a single light assembly unit:
- a light fixture comprising at least one light source—may also comprise a main circuit board or control board, an optical assembly, a light fixture housing and a cover plate on the optical assembly,
- a handlebar grip—preferably designed as a 2-component injection moulded part with a rigid base housing for firm clamping on the handlebar tube and a soft, rubber-like grip section to improve the feel and provide optimum ergonomics for the cyclist,
- an operating element comprising, for example, a push button for actuation by the cyclist—may comprise a flexible printed circuit board, SMD or otherwise equipped with a connector plug for connection to a power source on the bicycle and/or to a corresponding light assembly attached to an opposite end of the handlebar tube for synchronising the lighting functions generated by the two light assemblies attached to opposite ends of the handlebar tube, as explained in more detail below.

The present invention represents an innovative light assembly for bicycles and e-bikes that offers a compact, cost-effective and easy-to-install solution. The light assembly increases the acceptance of lighting systems among bicycle and e-bike riders and at the same time makes it possible to take full advantage of the new legal options for direction indicator lights and other lighting functions on bicycles and e-bikes, as well as increasing safety and comfort for cyclists.

The light assembly according to the invention can be designed to implement one or more lighting functions or parts thereof. These lighting functions include, for example, a turn signal function, a daytime running light or a position light function, a rear light or brake light function, or a hazard warning light function. The following description refers mainly to the indicator light function, but the explanations also apply accordingly to other lighting functions, even if this is not expressly mentioned in the individual case.

To reduce weight, installation effort and complexity, the present invention suggests that all functionally relevant components of a conventional two-wheeled vehicle lighting system be attached to the handlebars of a bicycle or e-bike as a separately manageable unit or integrated into the handlebar grips to be mounted at the distal ends of the handlebars. Together with the handlebar grip, the components form a unit that can be handled easily and separately and that can be mounted on the distal ends of the handlebar.

Almost all conventional e-bikes currently have a so-called mid-drive motor located in the area of the bottom bracket. The motor is usually equipped with sockets for connecting and supplying power to the rear light and front headlight of the e-bike. Many e-bike motors also have one or more sockets for connecting additional devices (AUX output). For example, the Bosch Performance Line CX Gen. 4 motor has a so-called high-power port, which is an AUX port with a maximum output voltage/current of 12 V/1 A. The AUX output can be used to transfer electrical energy from the e-bike's drive battery to additional components.

The light assembly according to the invention can be easily connected to this AUX port as a power source for electrical power supply using an electrical connection cable. It would also be conceivable to connect the light assembly directly to an e-bike's drive battery as a power source. Finally, it would also be conceivable to connect the light assembly to a separate battery or any other power source (e.g., a dynamo) provided in the bicycle or the e-bike.

The light assembly according to the invention can be installed by a layperson in just a few minutes. Only the following steps need to be carried out:
- loosen a clamping screw on the existing handlebar grips, remove the grips from the handlebar tube, slide on the handlebar grips according to the invention together with the other components with which the handlebar grips form an integral unit, and tighten the clamping screw,
- routing an electrical connection cable for supplying power to the light assembly in or on the handlebar tube and possibly in or on other tubes of the bicycle from the light assemblies to the power source of the bicycle, and
- connecting or inserting plug contacts of the connection cable into corresponding contacts on the light assemblies and into the power source of the bicycle.

The electrical connection cable can simultaneously form an electrical signal cable between the light assemblies, which is configured to transmit synchronisation signals between the light assemblies for synchronising the lighting functions generated by the light assemblies. Alternatively, however, in addition to the electrical connection cable to the power source, a separate electrical signal cable can be routed between the light assemblies attached to opposite ends of the handlebar tube in or on the handlebar tube and connected to the light assemblies.

In the industrial manufacture of e-bikes, the connection cable is routed through the bicycle frame to the mid-motor together with all other cables of the bicycle cable harness. The handlebar grips of the light assembly according to the invention with the integrated light fixture components are mounted on the ends of the handlebars in a few seconds, just like conventional bicycle grips. The additional time required to install the light assembly according to the invention in industrial production is only a few seconds and consists of plugging the connector contacts of the connection cable into the two light assemblies and the AUX connection of the mid-motor or another power source.

In addition to reducing the complexity and time required for assembly, the invention also meets the lightweight construction requirements typical in bicycle manufacturing, as the light assemblies are only about 20% heavier than conventional plastic handles and approx. 90% lighter than the conventional motorcycle indicator solution with four individually mounted indicators, including mounting material, cables, separate control electronics and standard plastic handles.

In addition to solving the aforementioned problems, the invention offers further important advantages in terms of safety:

significantly improved visibility of the direction change signal, possibility of expanding the light assemblies with a position light function, which also improves road safety, possibility of expanding the light assemblies with one or more additional light functions, e.g., rear light, brake light or hazard warning light function, which also improves road safety, with the indicator light function, clear and unambiguous communication of the intention to turn and accompaniment of the turning manoeuvre by means of legally compliant indicator light, visible from the front and rear, enhanced driving safety because both of the rider's hands remain on the handlebars at all times, possibility of a comfort indicator light function, in which the indicator lights continue to flash when the vehicle is stationary and are automatically deactivated after a few seconds or after a certain distance has been travelled. This prevents accidental continuous flashing.

The particular design of the light assembly comprises the handlebar grip and, as an integral part at a distal end or an end face of the handlebar grip, a light fixture which is preferably designed in accordance with EP 2 439 132 A1. The light fixture comprises a light fixture housing with a cylindrical shape, wherein the diameter of the housing corresponds approximately to the diameter of the handlebar grip. A longitudinal axis of the handlebar grip is preferably congruent with a longitudinal axis of the light fixture housing. The at least one light source is arranged and electrically connected in the housing. The light fixture housing is preferably made of metal for improved heat dissipation.

An optical assembly, preferably made of translucent glass or plastic, is mounted on the light fixture housing. A main direction of radiation of the at least one light source is directed towards the optical assembly. The light emitted by the light source is coupled into the optical assembly and is deflected by the latter at one or more boundary surfaces, preferably by means of total internal reflection, into at least one main emission direction. The optical assembly preferably has the shape of a truncated cone. When the light assembly is correctly mounted, the main emission direction is preferably directed in the direction of travel of the bicycle or opposite to the direction of travel.

A cover plate is attached to the optical assembly on a side opposite to the light fixture housing, e.g., by means of adhesive. This is made of plastic or metal, for example. The cover plate can protect the optical assembly from damage in the event of a crash or contact with a hard object, e.g., a house wall. In the event of damage, the cover plate or the entire light fixture can be replaced quickly and easily. In particular, the proposed concept of a detachable connection cable makes it quick and easy to replace the light fixture, even for people with no technical knowledge.

The two light assemblies attached to opposite ends of a handlebar tube are connected to the bicycle's power source via a connection socket, which can be arranged and contacted on a flexible circuit board of the operating element, via a preferably Y-shaped electrical connection cable. For this purpose, the connection cable can have two wires, one for the '+' and one for the '−' polarity of the power supply. Alternatively, the connection cable can also have only one wire for the power supply, e.g., for the '+' polarity of the power supply, in which case the '−' polarity can be provided by the ground or metal tubes of a metal frame of the bicycle. The connection between the light assemblies can also serve as an electrical signal cable for synchronising the lighting functions generated by the light assemblies. Furthermore, the signal cable can be used to transmit the actuation or activation of the operating elements of the two light assemblies formed on the handlebar grips to the respective other light assembly. For example, if the right handlebar indicator light flashes and the user actuates the operating element provided on the left light assembly, the handlebar indicator light on the right side goes out. The handle indicator light on the left side can flash immediately afterwards, either automatically or only after the left operating element is actuated again.

The structure and function of the light assembly or lighting system according to the invention are explained below using a direction indicator light as an example. However, the explanations also apply accordingly to other lighting functions. The light required for the function of the light fixture, a direction indicator light, is generated by one or more semiconductor light sources, e.g., high-power light-emitting diodes (LEDs). Phosphor-converted LEDs that emit amber light are very well suited for this purpose. These typically use a blue LED chip that emits light with a wavelength in the range of approximately 440 to 470 nanometres (nm). The semiconductor is assigned a phosphor layer, which converts part of the emitted light into light of a longer wavelength, so that an overlap of the unconverted blue and converted longer-wave light components produces the desired light colour of the flashing light (e.g., amber-coloured light). Of course, other semiconductor light sources can also be used which generate the desired light colour of the flashing light by superimposing different coloured light components or directly. In particular, the use of one or more RGB LEDs in the light assembly is envisaged, which depending on the control can emit red, green or blue light or any colour mixture of these primary colours. In this way, a light assembly can be used to implement various lighting functions that require different coloured light, e.g., amber light for flashing lights, white light for position lights, red light for rear lights or brake lights.

The LEDs are mounted and connected on a printed circuit board using an SMD process. Of course, the LEDs can also be mounted and connected to the printed circuit board in other ways. The printed circuit board can be thermally coupled to the metal housing of the light fixture to dissipate the power loss generated during operation of the light fixture in the form of heat to the metal housing, which in turn radiates the heat to the environment. The thermal coupling of the printed circuit board to the metal housing is preferably achieved by means of a heat-conductive adhesive bond or by any other means.

Furthermore, a clocked switching regulator is arranged and contacted on the main circuit board of the light fixture to provide the clocked current required for operating the light source(s) of the light fixture. The amount of operating current provided determines the brightness of the LED. The operating current can be continuously monitored and regulated to a predetermined value independently of the input voltage of the power source in order to avoid fluctuations in the brightness of the lighting function.

Furthermore, the main circuit board is equipped with control electronics in the form of a microcontroller, which controls the functions and operating states of the light fixture or the light source(s), respectively. Additional electrical and electronic components with which the main circuit board can be equipped have the task of protecting the entire electrical circuit against reverse polarity and overvoltage.

Further features and advantages of the invention are explained in more detail below with reference to the figures. Individual features shown in the figures may also be essential to the invention on their own, even if this is not shown in the figures and not expressly mentioned in the description. Similarly, the features shown in the figures may also be combined with each other in any manner, even if such a combination is not shown in the figures and not expressly mentioned in the description.

BRIEF DESCRIPTION OF THE DRAWINGS

The drawing includes FIGS. 1-9, which show.

DETAILED DESCRIPTION OF THE INVENTION

Figure 1:
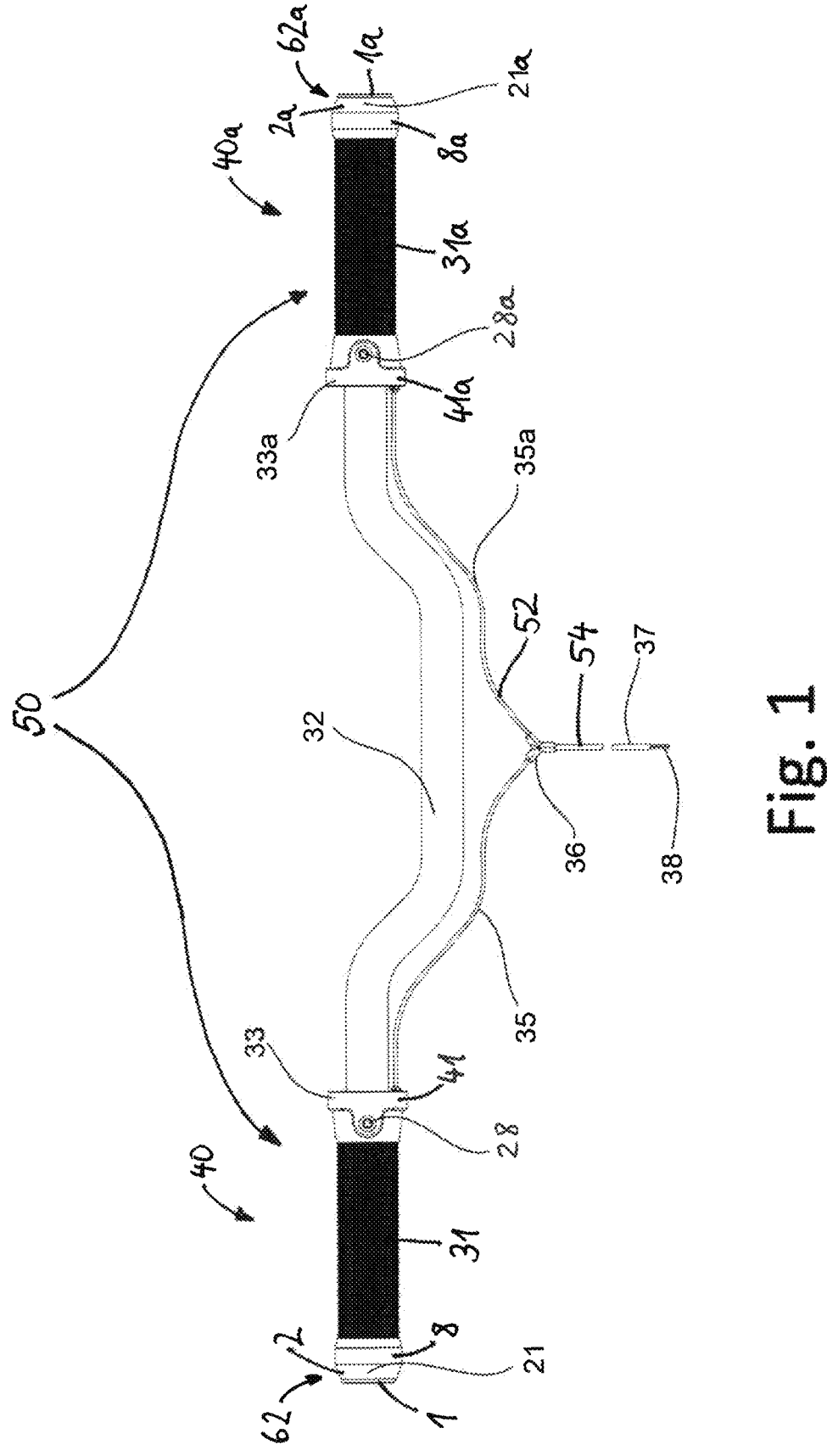
FIG. 1 a handlebar tube of a bicycle, in particular of an e-bike, with a lighting system according to the invention attached thereto, which comprises light assemblies according to the invention attached to opposite ends.

FIG. 1 shows a lighting system 50 according to the invention, which is attached to a bicycle (not shown), in particular to an e-bike, for the purpose of providing a lighting function. The lighting system 50 comprises two light assemblies 40 according to the invention, which are attached to opposite distal ends of a handlebar tube 32 of the bicycle. In particular, one of the light assemblies 40 is designed for mounting as an integral unit on a first distal handle end of the handlebar tube 32 of the bicycle and the other light assembly 40 is designed for mounting as an integral unit on a second distal handle end of the handlebar tube 32 opposite to the first distal handle end.

The lighting system 50 comprises an electrical signal cable 52 which runs between the light assemblies 40 and is designed to transmit synchronisation signals between the light assemblies 40 for synchronising the lighting functions generated by the respective light assemblies 40. Furthermore, the lighting system 50 comprises an electrical connection cable 54 between the light assemblies 40 on the one hand and a power source (not shown) of the bicycle on the other hand. The connection cable 54 is designed to transmit electrical energy from the power source to the light assemblies 40 for operating the latter. The connection cable 54 has a vehicle-specific plug 38 for connection to a power source. It is conceivable that the signal cable 52 and the connection cable 54 are at least partially implemented by a common cable harness. In the example shown, a single Y-shaped cable harness is provided. One or more wires of the cable harness can serve as signal cable 52 and/or as connection cable 54. It is conceivable that identical wires of the cable harness serve both as signal cable 52 and as connection cable 54. In the example shown in FIG. 1, parts 35, 35*a* of the cable harness serve both as signal cables 52 and as connection cables 54. The same or different wires of the cable harness can be used for this purpose. A part 37 of the cable harness or the corresponding wires serve exclusively as connection cables 54. The reference number 36 denotes a junction of the cable harness or the corresponding wires. The cable harness 35, 35*a*, 36, 37 can be routed inside the handlebar tube 32 and, if necessary, other tubes of the bicycle frame or, as shown, outside.

The reference number 38 denotes a connection-specific plug of the cable harness 35, 35*a*, 36, 37 for connection to the power source of the bicycle. The connection to the power source into which plug 38 can be inserted can be an AUX connection of an e-bike motor, a connection directly to a drive battery of an e-bike, a connection to a separate battery provided in the bicycle or e-bike, or a connection to any other electrical power source (e.g., a dynamo).

Figure 2:
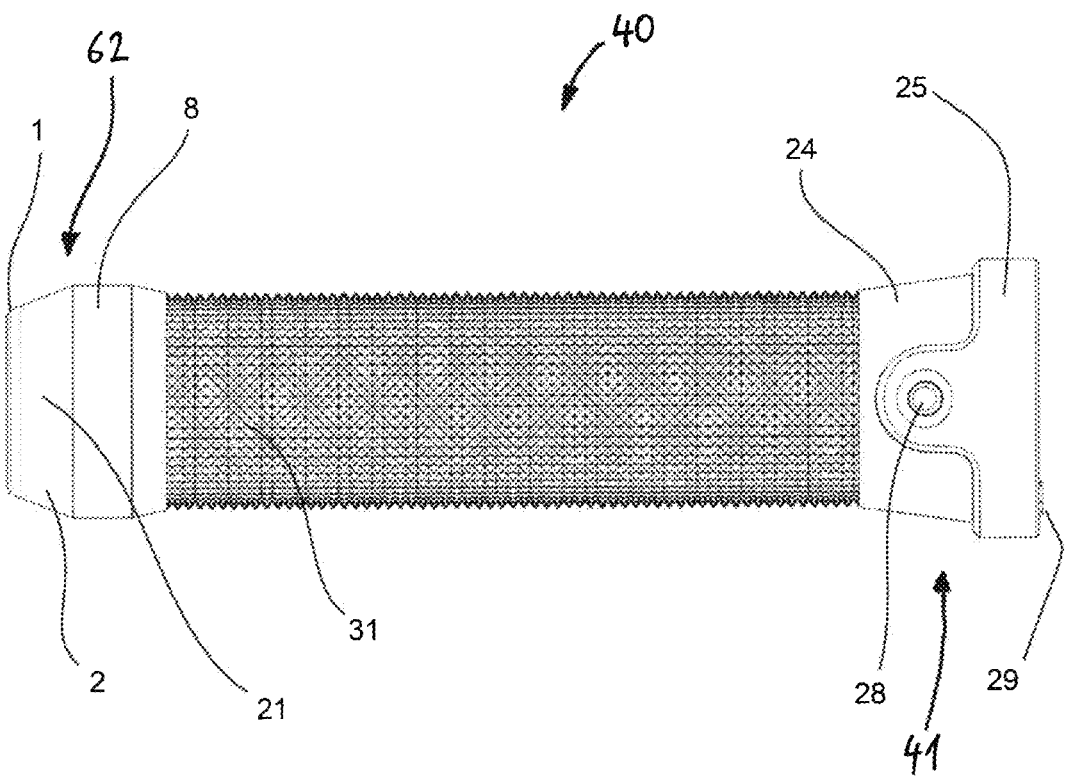
FIG. 2 a light assembly according to a preferred embodiment of the invention in a fully assembled state and ready to be attached to a distal end of the handlebar tube.

FIG. 2 shows one of the light assemblies 40 of the lighting system 50 from FIG. 1. The light assembly 40 is designed for mounting on a bicycle, in particular on an e-bike, and for implementing a lighting function or part thereof. The light assembly 40 comprises a light fixture 62 with at least one light source 5 (see FIG. 4), in particular a semiconductor light source, most preferably an LED, and control electronics 16 (see FIG. 5), which are designed to control the light source 5 and to implement the lighting function.

To implement an indicator light function, a high-performance LED that emits amber-coloured light is preferably used as the light source 5. For this purpose, an LED chip of the LED can, for example, emit blue light, part of which is converted into longer-wave light by a converter material assigned to the LED chip, for example phosphor, and a superposition of the blue and the converted longer-wave light components produces the amber-coloured light. Alternatively, an RGB LED can be used as light source 5, comprising three LED chips that respectively emit red, green or blue light, and the desired colour of the light emitted by the LED is produced by superimposing the more or less intense red, green and blue light components.

To implement a daytime running light or position light function, a high-performance LED that emits white light is preferably used as light source 5. The white light can be produced by superimposing unconverted light components and light components converted by a converter material or by using an RGB LED and controlling the individual RGB LED chips accordingly. The light source 5 emitting white light can be provided in addition to the light source 5 emitting amber light or instead thereof. It would also be conceivable, for example in the case of an RGB LED 5, for this to emit amber or white light depending on the control of the RGB LED chips.

To implement a rear light or brake light function, a high-performance LED that emits red light is preferably used as light source 5. The red light can be produced by superimposing unconverted light components and light components converted by a converter material or by using an RGB LED and controlling the individual RGB LED chips accordingly. The light source 5 emitting red light can be provided in addition to the light source 5 emitting amber light or instead of or in addition to the light source 5 emitting white light. It would also be conceivable, for example in the case of an RGB LED 5, that this emits amber, white or red light depending on the control of the RGB LED chips.

The control electronics 16 are preferably designed as a microcontroller or microprocessor on which a computer program can run. The computer program is programmed to control the light source 5 and the lighting function when it runs on the microcontroller or microprocessor. The control electronics 16 is preferably an integral part of the light fixture 62. Preferably, the control electronics in the form of the microcontroller or microprocessor is arranged and contacted on a main circuit board 6 of the light fixture 62, which also carries and contacts the at least one light source 5.

Furthermore, the light assembly 40 advantageously comprises a handlebar grip 31 intended for mounting on a distal handle end of the handlebar tube 32 of the bicycle. The handlebar grip 31 may comprise a grip housing 25, with which the handlebar grip 31 can be fastened to the handlebar tube 32, and a grip part 24, which is fastened to the grip housing 25.

The light fixture 62, the control electronics 16 and an operating element 28, in particular a button, most preferably a push button, which is designed to control the at least one light source 5, are designed as an integral unit 33, 33*a* (see FIG. 1) together with the handlebar grip 31. The handlebar grip 31 with the light fixture 62, control electronics 16 and operating element 28 attached to it or formed integrally therewith is designed for mounting on the distal handle end of the handlebar tube 32 as an integral unit 33, 33*a*, which can be separately handled.

The handlebar grip 31 has a substantially hollow cylindrical shape and an opening on a first end face for receiving a distal end of a handle end of the handlebar tube 32 of the bicycle. The light fixture 62 is preferably arranged or attached to a second end face of the handlebar grip 31 opposite to the first end face. The attachment can be effected by gluing, screwing or by other means.

The operating element 28 is preferably arranged or formed on a peripheral surface of the handlebar grip 31 in the region of the first end face of the handlebar grip 31. The operating element 28 is arranged on the handlebar grip 31 in such a way that, when the unit 33, 33*a* is properly attached to the handlebar tube 32, it faces the rider so that the rider can operate the operating element 28 with his thumb.

Alternatively, the operating element 28 could also be designed as a rotary switch which can be moved into different switching positions by rotation about the longitudinal axis of the handlebar grip 31 or the handlebar tube 32. Depending on how the rider operates the operating element 28, the lighting function can be activated and/or deactivated, or one of several lighting functions that can be realised by the light assembly 40 can be selected.

The light fixture 62 comprises at least one optical assembly 2, which is designed to bundle light emitted by the at least one light source 5, 5*a* in a main radiation direction 64 and/or to deflect it into at least one main emission direction 66 of the lighting function. The main radiation direction 64 of the light source 5, 5*a* runs, when the unit 33, 33*a* is properly attached to the handlebar tube 32, preferably parallel to the longitudinal axis of the handlebar tube 32 or transversely to a direction of travel of the bicycle. The main emission direction 66 of the lighting function preferably runs in or opposite to the direction of travel of the bicycle. Thus, the optical assembly 2 is preferably designed to perform a 90° deflection of the light in or opposite to the direction of travel of the bicycle. In the example shown in FIG. 4, the light fixture 62 comprises two light sources 5, 5*a*, each of the light sources 5, 5*a* being assigned a separate collimator 13, 13*a* of the optical assembly 2 in order to focus and/or deflect the light emitted by the light sources 5, 5*a*.

The optical assembly 2 preferably comprises a solid light-transmissive material, e.g., a transparent plastic or glass, in particular PMMA. The light emitted by the light source 5 is coupled into the optical assembly 2 via a light coupling surface, reflected therein at boundary surfaces 3, 3*a*, preferably by means of total internal reflection, and coupled out of the optical assembly 2 via a light decoupling or exit surface 21, 21*a*. The boundary surfaces 3 are formed between the optically denser transparent material of the optical assembly 2 and an optically less dense adjacent medium, e.g., air. It would also be conceivable that the optical assembly 2 comprises more than one boundary surface 3, 3*a*. Preferably, one boundary surface 3, 3*a* is assigned to one light source 5, 5*a*. However, it would also be conceivable for several boundary surfaces 3 to be assigned to a single light source 5 and for the deflection of the light from a light source 5 to involve multiple reflections at the boundary surfaces 3.

Figure 4:
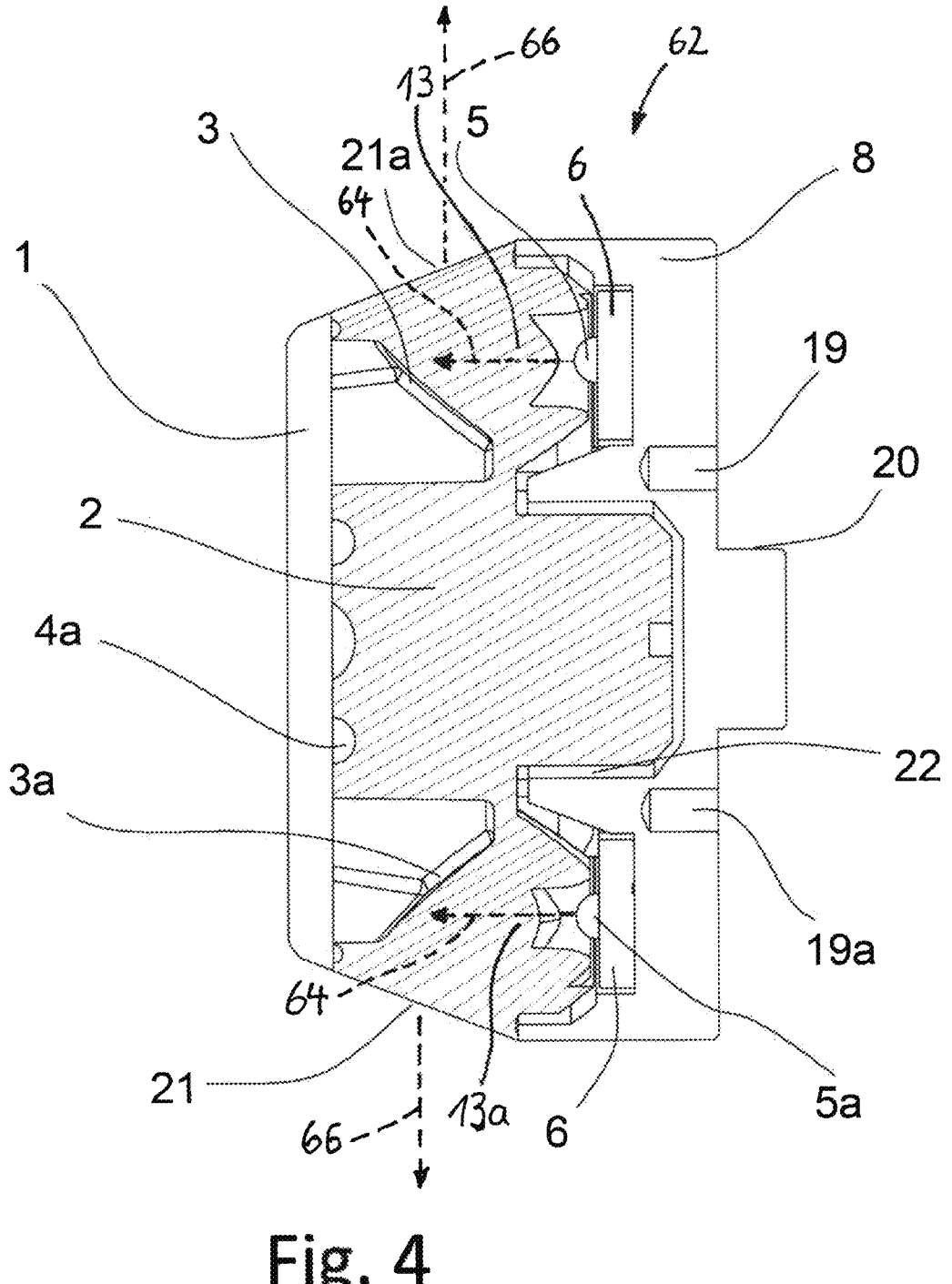
FIG. 4 a light fixture of the light assembly from FIG. 2.

Particularly preferred, the optical assembly 2 is embodied as shown in FIG. 4, to deflect light emitted by at least one light source 5, 5*a* in the main radiation direction 64 into two main emission directions 66, 66*a* directed opposite to each other, one of the main emission directions 66*a* being preferably directed in the direction of travel of a bicycle equipped with the light assembly 40 and the other main emission direction 66 being directed opposite to the direction of travel of the bicycle.

As further shown in FIG. 4, the light fixture 62 preferably comprises at least two light sources 5, 5*a*, one of the light sources 5*a* being designed to emit light which, after being deflected by the optical assembly 2, is directed in the direction of travel of the bicycle, and the other light source 5 being designed to emit light which, after being deflected by the optical assembly 2, is directed opposite to the direction of travel of the bicycle.

In addition, the light fixture 62 may comprise a light fixture housing 8 (see FIG. 3) made of plastic, metal or another suitable material. In the case of a light fixture housing 8 made of metal, the main circuit board 6, on which the at least one light source 5 is arranged and electrically contacted, may be thermally coupled to the metal housing 8.

Figure 6:
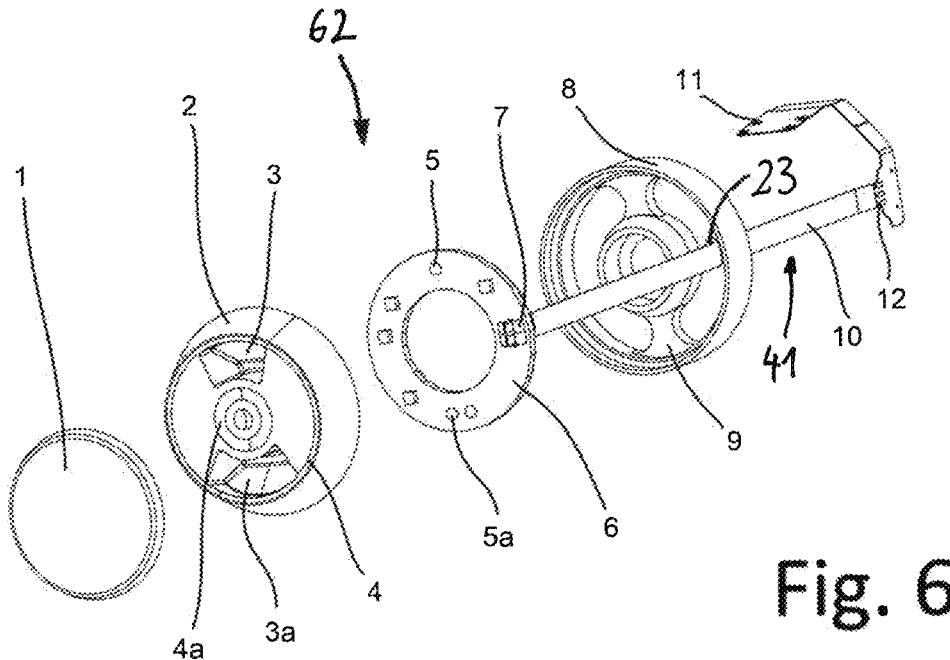
FIG. 6 the light fixture from FIG. 4 with part of an operating element of the light assembly from FIG. 2 in an exploded view from another viewing direction.

In this way, heat loss generated during operation of the light assembly 40 or the light source 5 can be dissipated to the environment via the metal housing 8. The main circuit board 6 is preferably thermally coupled to the metal housing 8 by means of a heat-conductive adhesive bond. A respective adhesive surface is designated by reference numeral 9 in FIG. 6.

Figure 5:
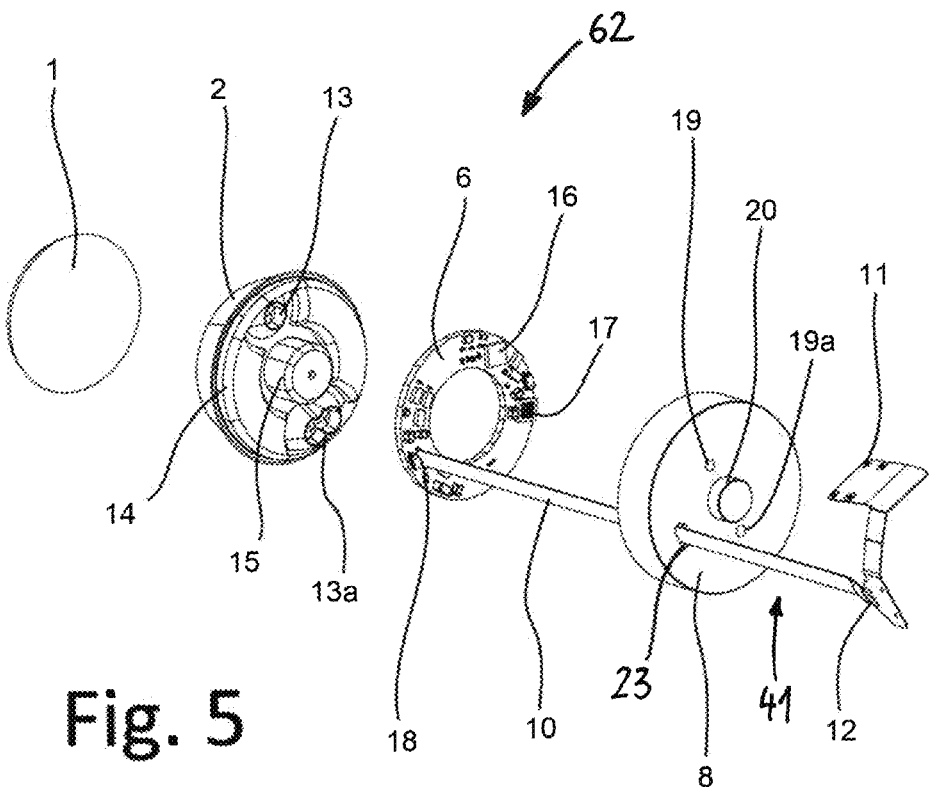
FIG. 5 the light fixture from FIG. 4 with part of an operating element of the light assembly from FIG. 2 in an exploded view from a first viewing direction.
Figure 8:
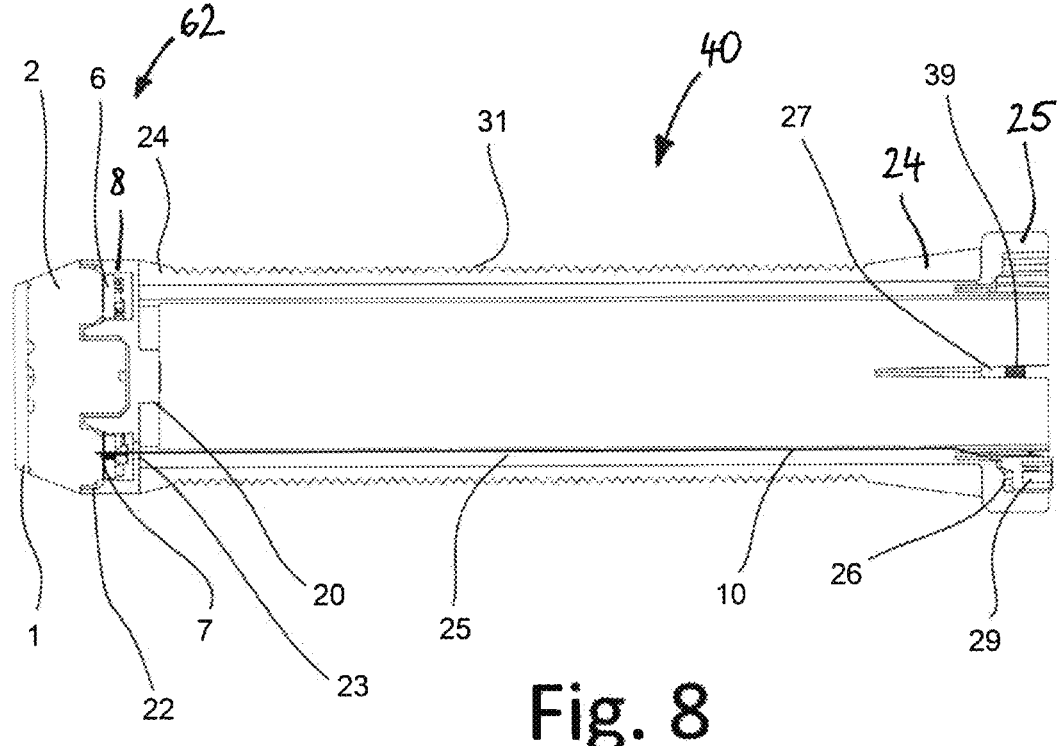
FIG. 8 the light assembly from FIG. 2 in another sectional view rotated by 90° about the longitudinal axis of the handlebar tube relative to the sectional view from FIG. 7.

The optical assembly 2 is mounted on the light fixture housing 8. The optical assembly 2 can also be fastened to the light fixture housing 8 by means of an adhesive bond or in any other manner (e.g., by means of a snap-in connection, screw connection, bayonet connection). FIG. 5 shows examples of respective adhesive surfaces 14, 15 and in FIG. 8 a respective adhesive gap 22 is provided with which the optical assembly 2 can be fastened to the light fixture housing 8. A protective cover or cover plate 1 made of plastic or metal is fastened to the optical assembly 2, for example by means of an adhesive bond, a snap-in connection, a screw connection, a bayonet connection or the like. To create an adhesive bond, grooves 4, 4a for an adhesive gap are formed on the external surface of the optical assembly 2 facing the cover plate 1. The light fixture 62 used preferably corresponds to the light fixture known from EP 2 439 132 A1. The content of EP 2 439 132 A1 is incorporated in its entirety into the content of the present invention by reference with regard to the structure and function of the light fixture.

The light fixture 62 can be attached to the handlebar grip 31 by means of an adhesive connection or in another way, e.g., by means of a screw connection. In particular, the light fixture 62 is designed to be attached to the grip housing 25 of the handlebar grip 31. For this purpose, fastening screws 42, 42a may be provided (see FIG. 3), which can be screwed from the inside of the handlebar grip 31 into corresponding fastening threads 19, 19a formed on the base surface of the light fixture housing 8. For precise positioning of the light fixture 62 relative to the handlebar grip 31, a centring element 20 is provided on the bottom surface of the light fixture housing 8 facing the handlebar grip 31, which engages in a corresponding recess (not shown) in one of the end faces of the handlebar grip 31 facing the light fixture 62.

In addition to the light sources 5, 5a and the control electronics 16, a switching regulator 17 for constant current control can also be arranged and contacted on the main circuit board 6. The switching regulator 17 can be designed as a clocked switching regulator which varies the level of the operating current, for example by means of pulse width modulation. Further electrical and electronic components with which the main circuit board 6 can be equipped have the task of protecting the entire electrical circuit of the light fixture 62 against reverse polarity and overvoltage.

Light sources 5, 5a in the form of LEDs emit light in a main direction of radiation 64, for example in a cone of 120° orthogonal to the circuit board 6. To this end, a bundling optic, for example a spherical lens made of a transparent material, such as plastic, which bundles the light emitted by the LED chip into the entire 180°-half space, may be arranged in the light emission direction in front of one or more LED chips of an LED 5, 5a, to form the 120° light cone.

In the light fixture 62, the arrangement and design of the light source(s) 5, 5a and the external shape, external surfaces (light entry surfaces and light exit surfaces 21, 21a) and boundary surfaces 3, 3a of the optical assembly 2 are preferably coordinated in respect to each other in such a way that the spatial light distribution required for the corresponding lighting function, e.g., the function of a direction indicator light, is fulfilled in accordance with ECE R50 or ECE R148. However, conformity with the legal provisions of the respective country or region where the light fixture 62 is intended to be used is not a mandatory requirement for the present invention.

Figure 9:
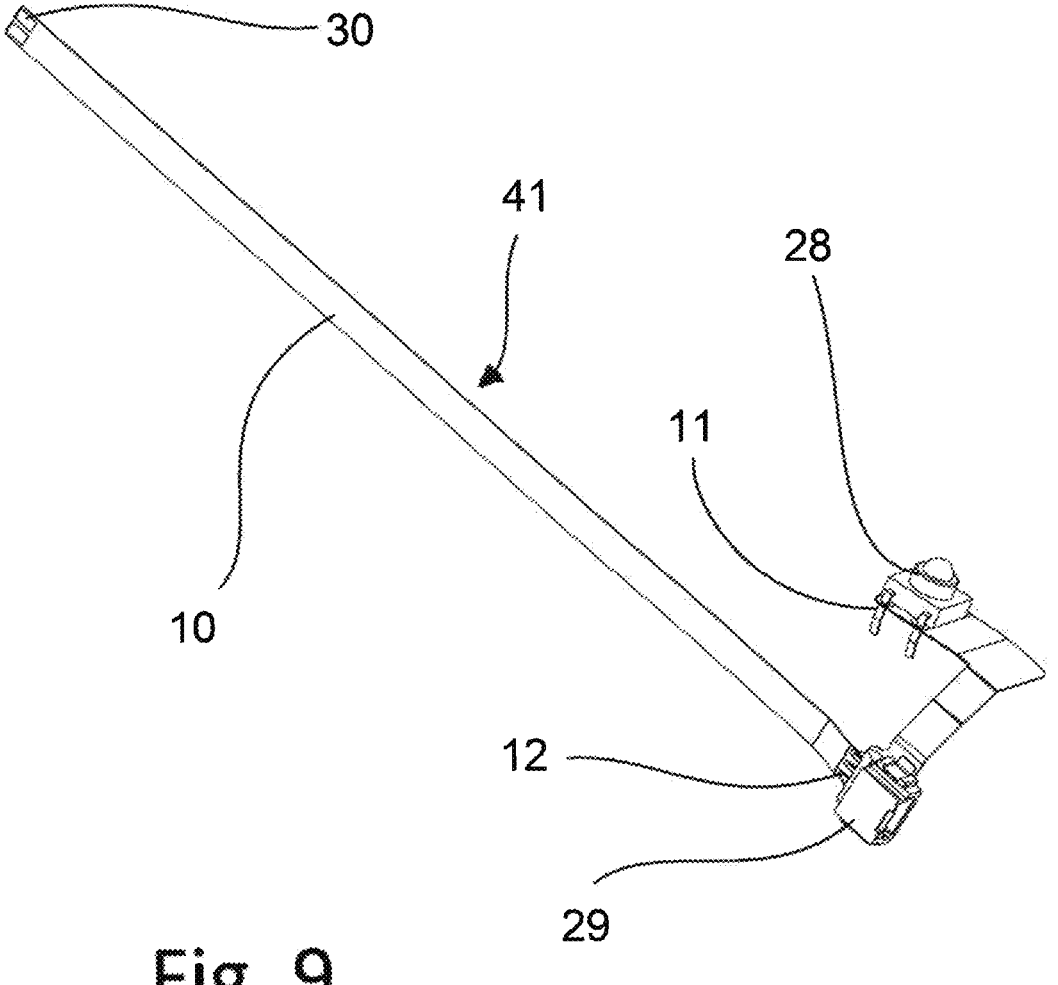
FIG. 9 an operating element of the light assembly according to the invention in a perspective view.

The light fixture 62 is operated by the cyclist via an operating element 28 integrated in the integral unit 33, 33a of the light assembly 40 according to the invention. The operating element 28 is connected to a flexible printed circuit board 10 of the operating element assembly 41 via a contact pad 11, in particular a THT (through hole technology) pad. The flexible printed circuit board 10 is in contact with the contact pad 11 or the operating element 28 on the one hand and is connected to the main printed circuit board 6 of the light fixture 62 via one or more contact pads 30 (see FIG. 9) on the other hand. The connection to the main circuit board 6 can be made by means of corresponding connector elements (one at the proximal end of the flexible circuit board 10 and the other on the main circuit board 6), which are plugged into each other, or by means of a solder connection between one or more conductor tracks of the flexible circuit board 10 and one or more solder pads 7 provided on the circuit board 6. A plug pad 12 is provided between the contact pad 11 for the operating element 28 and the flexible circuit board 10, which can be connected to a connection socket 29 (see FIG. 9). The connection socket 29 is provided in the handlebar grip 31 or the grip housing 25, in particular on the first end face of the handlebar grip 31 next to the opening for receiving the distal end of the handlebar tube 32. A corresponding plug element (not shown), which is provided at the distal end of the signal cable 52 or the connection cable 54 or the wire arms 35, 35a of the cable harness 35, 35a, 36, 37, can be plugged into the connection socket 29 in order to connect the light assembly 40 to the power source and the other light assembly 40a at the opposite distal handle end.

A switching signal from the operating element 28 of a light assembly 40 attached to a first distal end of the handlebar tube 32 of a bicycle is transmitted via the flexible printed circuit board 10 to the main printed circuit board 6 and on to the control electronics 16 of the corresponding light assembly 40. The control electronics 16 located on the main circuit board 6 receives the switching signal from the operating element 28 and controls the LEDs 5, 5a, which are preferably also located on the main circuit board 6, accordingly.

Furthermore, the switching signal of a first light assembly 40 of a lighting system 50 can be transmitted to another light assembly 40 of the lighting system 50 via the signal cable 52 or via parts 35, 35a, 36 of the cable harness 35, 35a, 36, 37. At the other light assembly 40, the switching signal then reaches the main circuit board 6 via the connection socket 29 and the flexible printed circuit board 10 and is forwarded to the control electronics 16 of the other light assembly 40. This allows the control electronics 16 located on the main circuit board 6 of the other light assembly 40 to receive the switching signal from the operating element 28 and to control the LEDs 5, 5a of the other light assembly 40, which are preferably also located on the main circuit board 6, accordingly.

Figure 3:
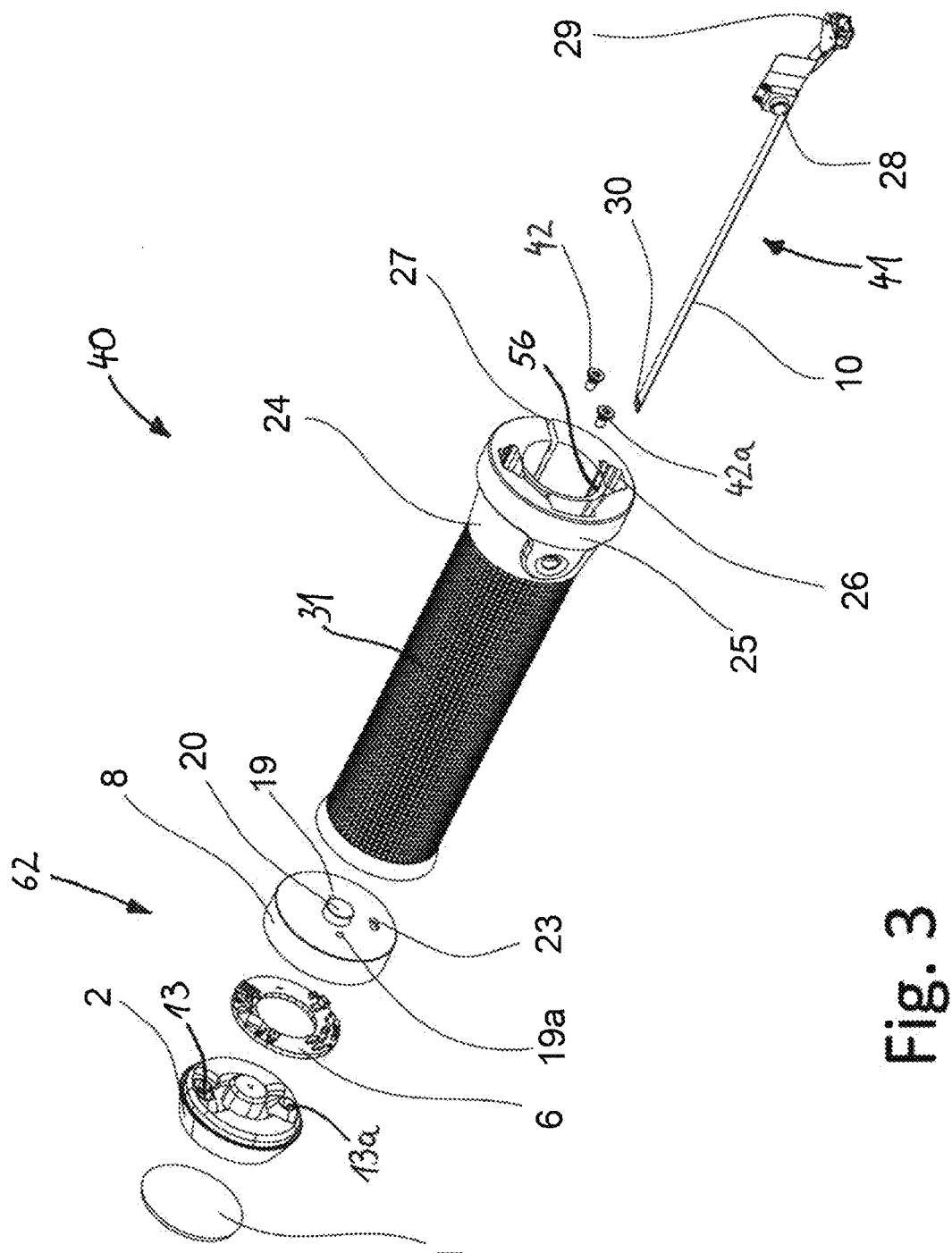
FIG. 3 the light assembly from FIG. 2 in an exploded view.

The flexible circuit board 10 preferably runs inside the handlebar grip 31 of the respective light assembly 40 but outside the handlebar tube 32. As can be seen in FIG. 3, it is particularly suggested that a longitudinal groove 56 is formed on the inside of the handlebar grip 31, which runs parallel to the longitudinal axis of the handlebar grip 31 or the handlebar tube 32 along the entire length of the handlebar grip 31 in the grip housing 25. At the first end face of the handlebar grip 31, the longitudinal groove 56 opens into an opening 26 formed in the grip housing 25. The flexible printed circuit board 10 of the operating element assembly 41 runs in the longitudinal groove 56 from the first end face to the light fixture 62 at the opposite end face. On the end face of the handlebar grip 31 opposite to the first end face and facing the light fixture 62, a slot-shaped opening (not shown) may be provided through which the flexible printed circuit board 10 is guided out of the handlebar grip 31 to the light fixture 62.

A passage 23 for the flexible printed circuit board 10 is formed in a base surface of the light fixture housing 8 facing the end face of the handlebar grip 31 opposite to the first end face. A distal end of the flexible circuit board 10 is contacted at a point 18 on the main circuit board 6. This can be done on the front side of the main circuit board 6 facing the light fixture housing 8 or on its rear side facing away from the light fixture housing 8. If the flexible printed circuit board 10 is contacted on the rear side of the main printed circuit board 6, a passage for the flexible printed circuit board 10 may be formed in the main printed circuit board 6 at the point 18, and the contact may be made on the rear side via a 90° solder connection.

It is preferred that the flexible printed circuit board 10 of the operating element assembly 41 is hermetically sealed at the opening 26 when entering the handlebar grip 31 and at the slot-shaped opening and/or the passage 23 of the light fixture housing 8 at the transition from the handlebar grip 31 into the light fixture 62. Finally, the groove 56 of the handlebar grip 31 can be filled with a sealing compound, e.g., a two-component sealing compound, to make it watertight (known as potting). The sealing also provides a structural connection between the connection socket 29 (see FIG. 8) and the operating element 28 to the handlebar grip 31 and ensures that the entire light assembly 40 is watertight and vibration-resistant.

The two handle indicator units 33, 33a are electrically connected to a power source of the vehicle via the connection cable 54, which is a 2-pole cable that conducts a supply voltage from the power source to the junction 36. In the Y-shaped junction 36, a printed circuit board is preferably moulded in a waterproof manner, to the ends of which all three cable parts 35, 35a, 37 are soldered.

The two connecting cables 35, 35a leading from the junction 36 to the handle indicator units 33, 33a are preferably 3-pole cables. Two wires of the cables 35, 35a conduct the supply voltage via the connection socket 29, the flexible printed circuit board 10 of the operating element assembly 41 to the main printed circuit board 6 of the light fixture 62. Synchronisation signals from the left handle indicator unit 33 and the right handle indicator unit 33a are each routed via the third wire of the connecting cables 35, 35a to the junction 36 and connected to each other on the distribution circuit board.

Figure 7:
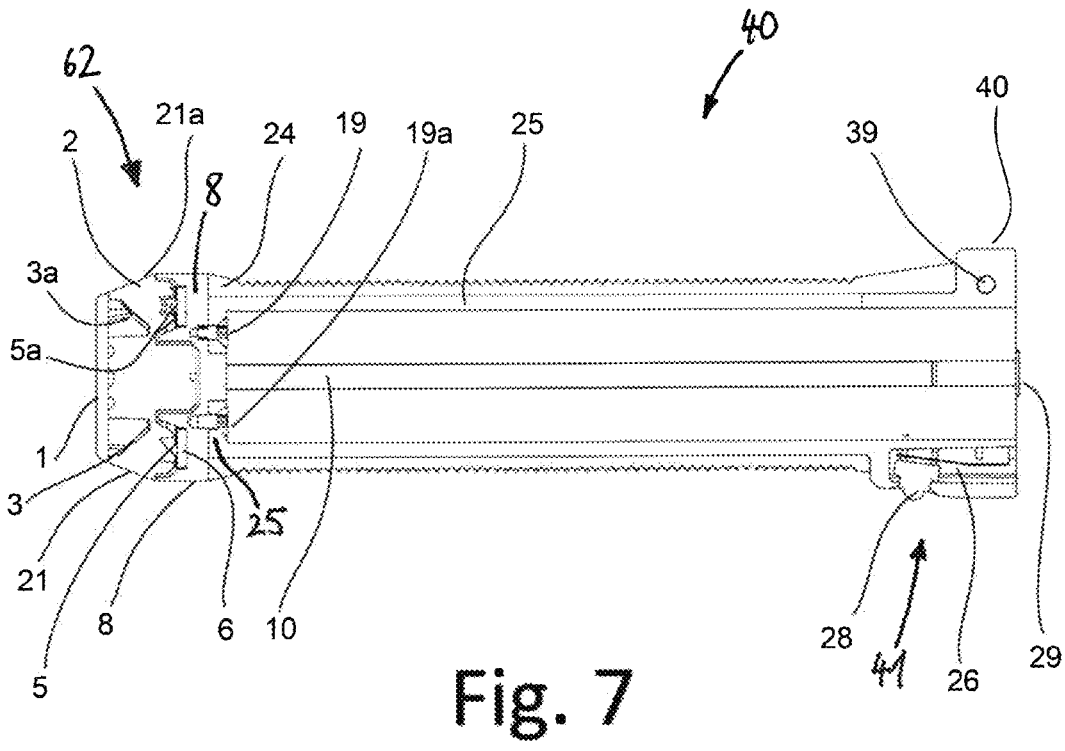
FIG. 7 the light assembly from FIG. 2 in a first sectional view along a longitudinal axis of the handlebar tube.

The grip housing 25 forms a stable, rigid part via which the handle indicator units 33, 33a of the light assembly 40 can be fastened to a distal end of the handlebar tube 32. To this end, a clamping gap 27 (see FIG. 3) is formed in a circumference of the grip housing 25, which, after the light assembly 40 has been fitted as a unit 31, 31a onto the handlebar tube 32, can be narrowed by means of a clamping screw 39 so that the grip housing 25 is clamped onto the handlebar tube 31 when the screw 39 is tightened (see FIGS. 7 and 8). The grip housing 25 preferably extends over the entire length of the handlebar grip 31. It is preferably made of a stable plastic or metal, in particular aluminium. A softer, rubber-like material of the grip part 24 can be applied to the outside of the grip housing 25 for a better feel and optimum ergonomics for the cyclist. The handlebar grip 31 is preferably designed as a two-component injection moulded part. However, it would also be conceivable to manufacture the grip part 24 as a tube made of a softer, elastic, rubber-like material and simply pull it lengthwise over the grip housing 25.

The light assembly 40 and the lighting system 50, respectively, according to the invention can produce various lighting functions or parts thereof. If a light assembly 40 only produces part of a lighting function, the desired lighting function can be produced together with the light from another light fixture of the bicycle. In particular, it is suggested that a light assembly 40 be designed to produce the following lighting functions:

Position light function: After the supply voltage is switched on, the light fixture 62 operates at a permanently constant and relatively low power. This increases the visibility of the vehicle's contours for other road users. White light is preferably emitted for this lighting function.

Direction indicator light function: Only after the operating element 28 is activated, e.g., by pressing a button, does the light fixture 62 flash on command. With this lighting function, amber light is preferably emitted. During the indicator light function, the position light on the flashing side of the vehicle or on both sides goes out. After the indicator light function has ended, light fixtures 62 and 62a on both sides of the vehicle emit position light again. It would be conceivable to map different indicator light modes depending on the length of a button press. For example, if button 28 is pressed for less than 1 second, e.g., for a lane change, light fixture 62 could flash only 3 times and then the indicator light function could be switched off automatically. If the button is pressed for longer than 1 second, light fixture 62 could be activated to flash continuously. The continuous flashing function could be deactivated, for example, by pressing operating element 28a on the opposite light assembly 40a or by pressing operating element 28 again, which triggered the current continuous flashing function.

Warning indicator light function: The light fixtures 62, 62a of both light assemblies 40, 40a of a lighting system 50 flash synchronously. Synchronisation signals can be exchanged via the signal cable 52 between the opposite light assemblies 40, 40a or their light fixtures 62, 62a or their control electronics 16. The activation and/or deactivation of this lighting function could be triggered by simultaneously actuating both operating elements 28, 28a.

To implement a turn signal and a position light function in a light fixture 62 of a light assembly 40, a light source 5, 5a of the light fixture 62 comprises either two separate LEDs, one of which can emit white light and the other amber light. Alternatively, the light source 5, 5a of the light fixture 62 may also comprise only one RGB LED with three LED chips that can respectively emit red, green and blue light. Suitable control of the LED chips to vary the intensity of the emitted red, green and blue light results in the desired amber or white light emitted by the light fixture 62 through superposition.

By additionally equipping the main circuit board 6 of the light fixture 62 with further light sources 5, 5a that can emit light in other colours (e.g., red) or by controlling the LED chips of an RGB LED accordingly, additional lighting functions (e.g., rear light or brake light) can be implemented. In this context, the light fixture 62 can emit a permanent position light in the direction of travel and opposite to the direction of travel a permanent rear light and, if necessary, a temporary brake light during braking. In this case, light source 5a would emit white light in the direction of travel of the bicycle in conjunction with the optical assembly 2, and light source 5 would emit red light opposite to the direction of travel in conjunction with the optical assembly 2. When an indicator light function or a hazard warning light function is activated, the position light as well as the rear light and brake light can be temporarily deactivated.

The main circuit board 6 of the light fixture 62 could also be equipped with a light source that emits blue light. This would allow blue flashing lights to be implemented, for example on bicycles used by law enforcement or emergency services, to increase their visibility in road traffic. Similarly, the main circuit board 6 could be equipped with a piezo loudspeaker that can acoustically support the optical blue flashing lights with a siren or a horn. Other special lighting functions of the light assembly 40 would also be conceivable.

The main circuit board 6 of the light fixture 62 could also be equipped with an acceleration sensor (a so-called G-sensor), e.g., as an SMD component or in another way, which detects negative acceleration as a result of braking and transmits a corresponding sensor signal to the control electronics 16, which then arranges for activation of the brake light. Similarly, further additional lighting functions can be implemented by modifying the programming of the control electronics 16 or the microcontroller.

One possibility would be a vibration-controlled indicator light switch-off, in which an indicator light that has been set flashes continuously when the vehicle is stationary and switches off automatically as soon as or shortly after the vehicle starts moving. Movement of the vehicle can be detected by detecting vibrations by means of a G-sensor. Preferably, the indicator light is automatically switched off after a preset period of time after the vehicle has started moving.

The invention claimed is:

1. A light system configured for mounting on a bicycle and for implementing a lighting function or part thereof, wherein the light system comprises two light assemblies configured to implement the lighting function or part thereof;

wherein each of the two light assemblies comprises as a respective integral unit, each having, a handlebar grip configured for mounting on a distal handle end of a handlebar tube of the bicycle, a light fixture with at least one light source comprising at least one semiconductor light source, control electronics for controlling the at least one light source and for realizing the lighting function, and an operating element for controlling the at least one light source; and wherein each of the two light assemblies is configured for mounting on the distal handle end as a respective unit;

wherein the two light assemblies include a first light assembly configured to mount as a first integral unit on a first distal handle end of a first handlebar tube of the bicycle, and includes a second light assembly configured to mount as a second integral unit on a second distal handle end of a second handlebar tube opposite to the first distal handle end; and wherein the light system comprises an electrical signal cable between the two light assemblies, which is configured to transmit synchronisation signals between the two light assemblies for synchronising respective lighting functions generated by the two light assemblies.

2. The light system according to claim 1, wherein the handlebar grip has a substantially hollow cylindrical shape and, on a first end face, an opening for receiving a distal end of a handle end of the handlebar tube of the bicycle; and the light fixture is arranged on a second end face of the handlebar grip opposite to the first end face.

3. The light system according to claim 1, wherein the handlebar grip has a substantially hollow cylindrical shape and, on a first end face, an opening for receiving a distal end of a handle end of the handlebar tube of the bicycle; and the operating element is arranged on a circumferential surface of the handlebar grip in the region of the first end face of the handlebar grip.

4. The light system according to claim 1, wherein the control electronics comprise a microcontroller on which a computer program is executable, which is programmed to control the at least one light source and the lighting function when running on the microcontroller.

5. The light system according to claim 4, wherein the microcontroller and the at least one light source are arranged and electrically contacted on a common main circuit board of the light fixture.

6. The light system according to claim 1, wherein the light fixture has at least one optical assembly which is configured to bundle light emitted by the at least one light source in a main radiation direction and/or to deflect it into at least one main emission direction of the lighting function; and the at least one optical assembly comprises a solid light-transmissive material into which the light emitted by the at least one light source in the main radiation direction is coupled and which comprises at least one boundary surface which is configured to redirect coupled-in light by means of total internal reflection into the main emission direction when it strikes the at least one boundary surface.

7. The light system according to claim 6, wherein the at least one optical assembly is configured to deflect light emitted from the at least one light source in the main radiation direction into two main emission directions directed opposite to each other, and a first direction of the two main emission directions is directed in the direction of travel of the bicycle equipped with the two light assembly and a second direction of the two main emission directions is directed opposite to the direction of travel of the bicycle.

8. The light system according to claim 7, wherein the light fixture has at least two light sources arranged at a distance from each other, a first one of the at least two light sources is configured to emit light which, after being deflected by the at least one optical assembly, is directed in the direction of travel of the bicycle, and a second one of the at least two light sources being configured to emit light which, after being deflected by the at least one optical assembly, is directed opposite to the direction of travel of the bicycle.

9. The light system according to claim 1, wherein the at least one light source is configured to emit amber light so that a respective lighting function provided by at least one of the two light assemblies includes a turn signal indicator light function and/or a position light function.

10. The light system according to claim 9, wherein the light fixture comprises at least one further light source which is configured to emit light of a different colour than the at least one light source; and the light emitted by the at least one further light source is white light either alone or by superposition with the light emitted by the at least one light source, so that a respective lighting function realized by at least one of the two light assemblies includes a position light function.

11. The light system according to claim 10, wherein the light fixture comprises at least one further light source which is configured to emit red light, so that a respective the lighting function realized by at least one of the two light assemblies includes a rear light function and/or a brake light function.

12. The light system according to claim 9, wherein the light fixture comprises at least one further light source which is configured to emit red light, so that a respective lighting function realized by at least one of the two light assemblies includes a rear light function and/or a brake light function.

13. The light system according to claim 1, wherein the operating element is arranged and designed in at least one of the two light assemblies, and is mounted on the handle end of the handlebar tube of the bicycle, so as to be operated by a finger or thumb of a rider of the bicycle equipped with the at least one of the two light assemblies to activate and/or deactivate a respective lighting function depending on the actuation of the operating element by the rider, or to select one of the respective lighting functions that can be realized by the at least one of the two light assemblies.

14. The light system according to claim 1, wherein the light fixture comprises a main circuit board on which the at least one light source is arranged and electrically contacted, and a metal housing;

the main circuit board is thermally coupled to the metal housing so that heat loss produced during operation of the light assembly is dissipated to the environment via the metal housing, and thermal coupling of the main circuit board to the metal housing is effected via a heat-conductive adhesive connection.

15. The light system according to claim 1, wherein the light system has an electrical connection cable between the two light assemblies and a power source of the bicycle, which is configured to transmit electrical energy from the power source to the two light assemblies.

16. The light system according to claim 1, wherein the light fixture comprises at least one further light source which is configured to emit light of a different colour than the at least one light source; and the light emitted by the at least one further light source is white light either alone or by superposition with the light emitted by the at least one light source, so that a respective lighting function realized by at least one of the two light assemblies includes a position light function.

17. The light system according to claim 1, wherein the light fixture comprises at least one further light source which is configured to emit red light, so that a respective lighting function realized by at least one of the two light assemblies includes a rear light function and/or a brake light function.

* * * * *